(12) United States Patent
Arceo et al.

(10) Patent No.: US 9,835,789 B2
(45) Date of Patent: Dec. 5, 2017

(54) ILLUMINATED OPERATIONAL DEVICE

(71) Applicants: DENSO International America, Inc., Southfield, MI (US); DENSO CORPORATION, Kariya, Aichi-pref. (JP)

(72) Inventors: Marc Arceo, Livonia, MI (US); Cary Horvath, Dearborn, MI (US); Gareth Webb, Farmington, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 203 days.

(21) Appl. No.: 14/880,507

(22) Filed: Oct. 12, 2015

(65) Prior Publication Data
US 2017/0102499 A1    Apr. 13, 2017

(51) Int. Cl.
*F21V 8/00* (2006.01)
*G06F 3/0354* (2013.01)

(52) U.S. Cl.
CPC ......... *G02B 6/0068* (2013.01); *G06F 3/0354* (2013.01)

(58) Field of Classification Search
CPC ........................... G02B 6/0068; G06F 3/0354
See application file for complete search history.

(56) References Cited

U.S. PATENT DOCUMENTS 5,676,449 A * 10/1997 Newsome .............. A42B 1/244
362/105
6,224,221 B1    5/2001 Glienicke

* cited by examiner

*Primary Examiner* — David V Bruce

(57) ABSTRACT

An operational element receives manipulation and moves relative to a base. A light source emits light. A visor is extended from the base and is located on an upper side of the light source.

14 Claims, 10 Drawing Sheets

ILLUMINATED OPERATIONAL DEVICE

TECHNICAL FIELD

The present disclosure relates to an illuminated operational device.

BACKGROUND

For example, a user may manipulate various operational devices such as a knob and/or a lever to operate a device. An operational device may have additional visual effect.

SUMMARY

According to an aspect of the preset disclosure, an operational element may be configured to receive manipulation and movable relative to the base. A light source may be configured to emit light. A visor may be extended from the base and located on an upper side of the light source.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION (First Embodiment)

As follows, a first embodiment of the present disclosure will be described with reference to drawings. In the description, a height direction is along an arrow represented by "HEIGHT" in drawing(s). A radial direction is along an arrow represented by "RADIAL" in drawing(s). A circumferential direction is along an arrow represented by "CIRCUMFERENTIAL" in drawing(s).

Figure 1:
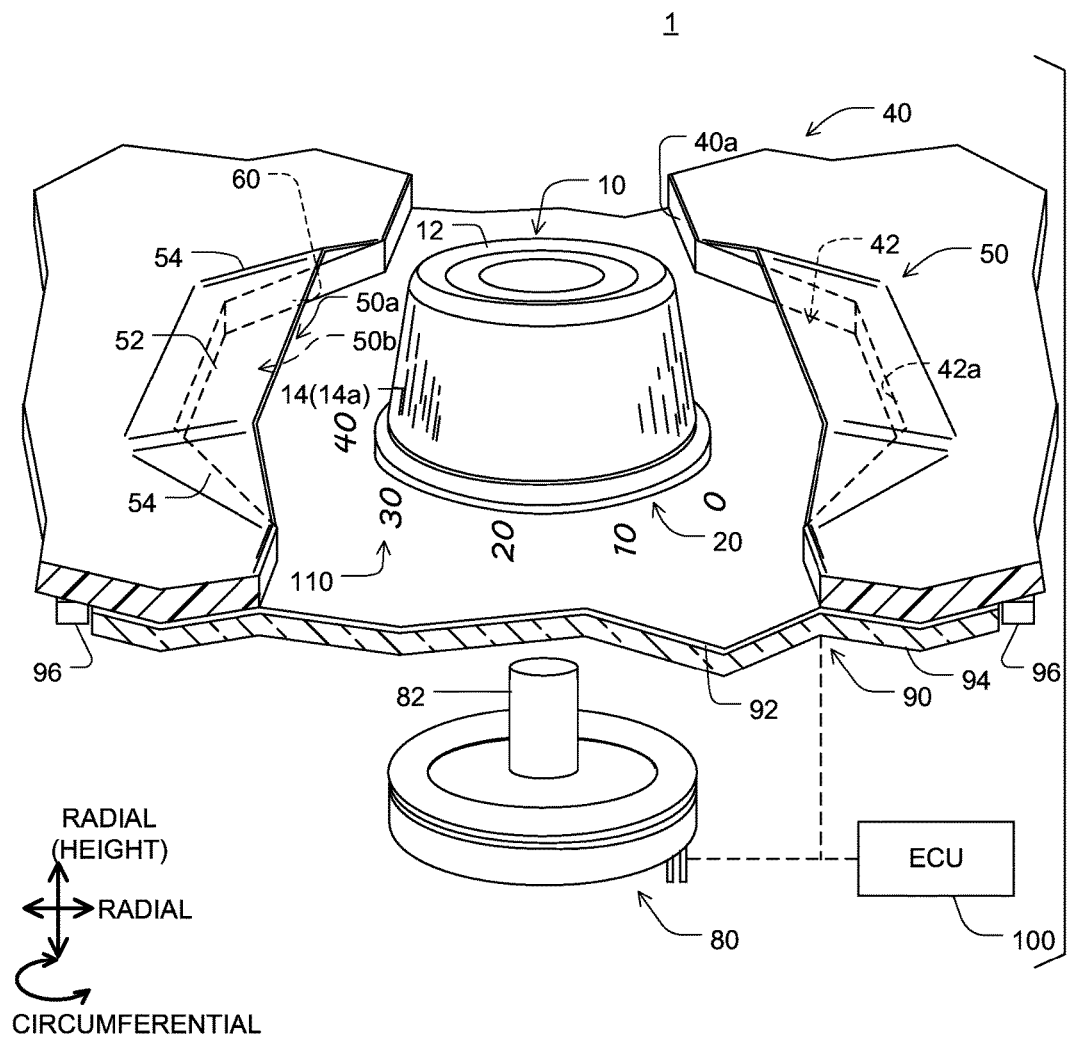
FIG. 1 is an exploded view showing components of an operational device of a first embodiment.

As shown in FIG. 1, in the example, an operational device 1 may include a knob 10, a bezel 20, a base plate 40, a visor 50, an encoder 80, and a display device 90.

The knob 10 may include a top wall 12 and a sidewall 14, which may be integrally molded of an opaque plastic material by injection molding. The opaque plastic material may be, for example, ABS resin. The top wall 12 may be in a circular plate shape. The sidewall 14 may be in a tubular shape extending in the circumferential direction. The knob 10 may expand from the top wall 12 to the bottom to form a chamfered conical shape. The sidewall 14 may form a round tapered surface. The knob may function as an operational element.

The bezel 20 may be integrally molded of an opaque plastic material such as ABS resin. The bezel 20 may be in an annular shape extending in the circumferential direction and having a width in the radial direction.

The display device 90 may include a screen 92, a light conductor 94, and a light source 96. The display device 90 may be, for example, an LCD display having, for example, a full-color dot-matrix configuration with multiple pixels 98 (FIG. 2), which may be selectively activated. More specifically, the display device 90 may be an active matrix display such as a TFT LCD display and may be configured to indicate, for example, a full-color moving picture on the screen 92. The display device 90 may indicate a symbol 110 in various forms such as a graphic pattern, a letter, and/or a gradation image. In the example of FIG. 1, the symbol 110 may be numerical letters 110.

The display device 90 may accommodate a driver circuit for controlling activation of the pixels 98, the light source 96, and an I/O device. The I/O device may be connectable with an electronic control device (ECU) 100 of a vehicle to receive an electric power and to exchange graphic information related to the indication with the ECU 100. The ECU 100 may control the display device 90 to indicate various information, such as infotainment contents information, navigation information, operation icons, and/or the like.

The light conductor 94 may be affixed to a rear surface of the screen 92. The light conductor 94 may be in a plate shape and may be formed of a non-opaque material. The non-opaque light-conductive material may be formed of acrylic resin (PMMA) or polycarbonate resin. The light source 96 may be located at an edge of the light conductor 94. The light source 96 may be LED and/or a fluorescence tube to emit, for example, white light. The display device 90 may have an edge-light configuration. Specifically, the light source 96 may emit light to the edge of the light conductor 94, and the light conductor 94 may irregularly reflect the light internally to diffuse the light toward the screen 92. In this way, the light conductor 94 may illuminate the screen 92 from the backside. Thus, the display device 90 may function as a light source to emit light through the screen 92. The display device 90 may have a circular center hole 90a (FIG. 2) around which the knob 10 and the bezel 20 are mounted coaxially with each other.

In another example, the display device 90 may employ a backlight configuration including a light source located behind the screen to emit light from the backside of the screen. In another example, the display device 90 may employ an organic EL display. The display device 90 may be an organic EL display having a self-luminous configuration without an additional light source.

The base plate (base) 40 may be a part of a control panel and/or a head unit of the vehicle. The base plate 40 may be opaque and may be formed of resin such as ABS resin. The base plate 40 may be equipped on the front side of the display device 90 such that the base plate 40 covers a part of the display device 90. In the example, the base plate 40 may have a line-symmetric structure in which the right side and the left side in FIG. 1 are symmetric relative to the center in FIG. 1. As follows, one side of the base plate 40 will be described as a representative example. The base plate 40 may have an inner periphery 40a, which linearly extends, and a dent 42, which is recessed inward form the inner periphery 40a. In the present example, the dent 42 may be in a trapezoidal shape.

The base plate 40 may be equipped with the visor 50. The visor 50 may be integrally formed with the base plate 40 to extend from a periphery 42a of the dent 42. In the example, the visor 50 may be formed of one center plate portion 52 and two side plate portions 54, which are integrated with the periphery 42a of the dent 42. The center plate portion 52 may be interposed between the two side plate portions 54 and inclined relative to the two side plate portions 54. The center plate portion 52 may be in a rectangular shape. The side plate portion 54 may be in a triangular shape. The center plate portion 52 may be interposed between the side plate portions 54 and may be inclined relative to the side plate portions 54.

Each of the center plate portion 52 and the side plate portions 54 may be inclined relative to the screen 92 such that the visor 50 forms an opening 50a. The opening 50a may have a cross section in a trapezoidal shape enlarged from the periphery 42a of the dent 42 toward a brim of the visor 50. The visor 50 and the dent 42 may form a hollow space 50b to which the screen 92 is exposed. The opening 50a of the visor 50 may have a cross section in various shapes such as a semicircular shape and/or a semioval shape.

The encoder 80 may include a rotary detector and a shaft 82. The rotary detector may include a hall element and a magnet. The hall element may generate a detection signal according to an intensity of a magnetic flux generated from the magnet to pass through the hall element. The shaft 82 may be rotationally supported by the rotary detector. The rotary detector may detect a rotational position of the shaft 82 according to intensity of the magnetic flux. The encoder 80 may transmit the detection signal to the ECU 100. The encoder 80 may be mounted on a printed circuit board (PCB) 180 (FIG. 2).

Figure 2:
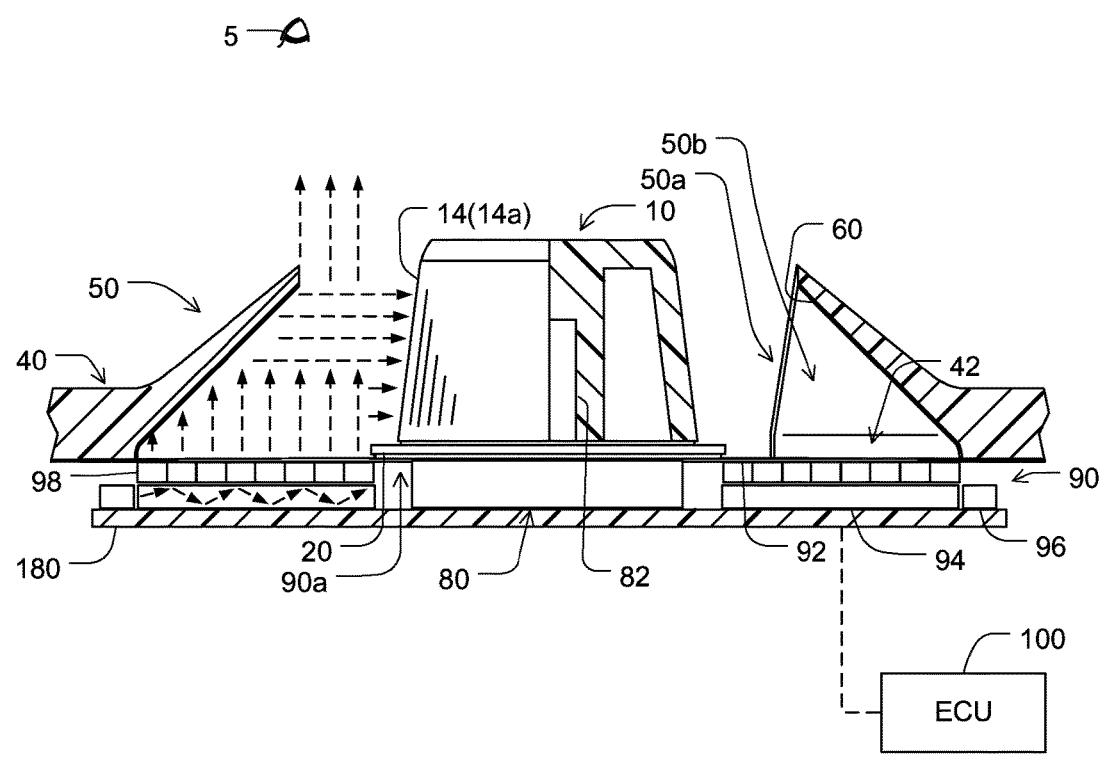
FIG. 2 is a partially sectional view showing the operational device.
Figure 2:
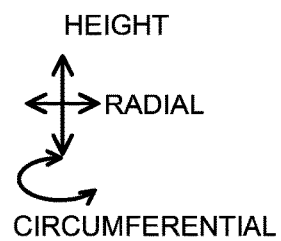

As shown in FIG. 2, the display device 90 may be affixed to the rear side of base plate 40. The bezel 20 may be mounted on the front side of the screen 92 to be coaxial with the center hole 90a of the display device 90. The encoder 80 may be located behind the display device 90 such that the shaft 82 of the encoder 80 is coaxial with the center hole 90a of the display device 90 and is protruded through the center hole 90a. The knob 10 may be affixed to the shaft 82 from the front side of the screen 92 such that the knob 10 may be rotational with the shaft 82. Thus, the knob 10 may be rotational relative to the bezel 20, the screen 92, and the base plate 40. A user may be enabled to manipulate the knob 10.

The visor 50 may have a reflective surface 60 opposed to the dent 42. The reflective surface 60 may be formed by, for example, plating the inner surface of the visor 50 with reflective material such as chrome. The reflective surface 60 may be formed by, for example, adhering a reflective sheet on the inner surface of the visor 50.

In FIG. 1, each of the center plate portion 52 and the side plate portions 54 may have a part of the reflective surface 60. The corresponding part of the reflective surface 60 of each of the center plate portion 52 and the side plate portions 54 may be angled relative to the screen 92 such that light emitted from the screen 92 and reflected on the reflective surface 60 of the visor 50 is directed toward a lateral surface 14a of the knob 10.

In FIG. 2, the screen 92 may have pixels 98 selectively activated according to the signal from the ECU. The light source 96 emits light, and the light conductor 94 diffuses the light internally to direct the light toward the screen 92 in a wide region. The activated or deactivated pixel 98 may pass the light therethrough toward the visor 50 and a user, while modifying the color and intensity of the light. The light reflected on the reflective surface 60 of the visor 50 may be directed to the lateral surface 14a of the knob 10 to illuminate the lateral surface 14a. Thus, the lateral surface 14a having the tapered round surface may be partially or entirely illuminated. The illumination may be controlled by modifying the color, intensity, and/or activated/deactivated region of the pixels 98. In the example, a part of the screen 92 concealed behind the visor 50 may function as a light source.

The symbol 110 indicated on the screen 92 may be viewed as an indication by a user 5 through a clearance between the visor 50 and the knob 10. Thus, the user 5 may view combination of the illumination on the lateral surface 14a of the knob 10 and the indication (e.g., symbol 110) on the screen 92 viewable through the clearance.

Figure 3:
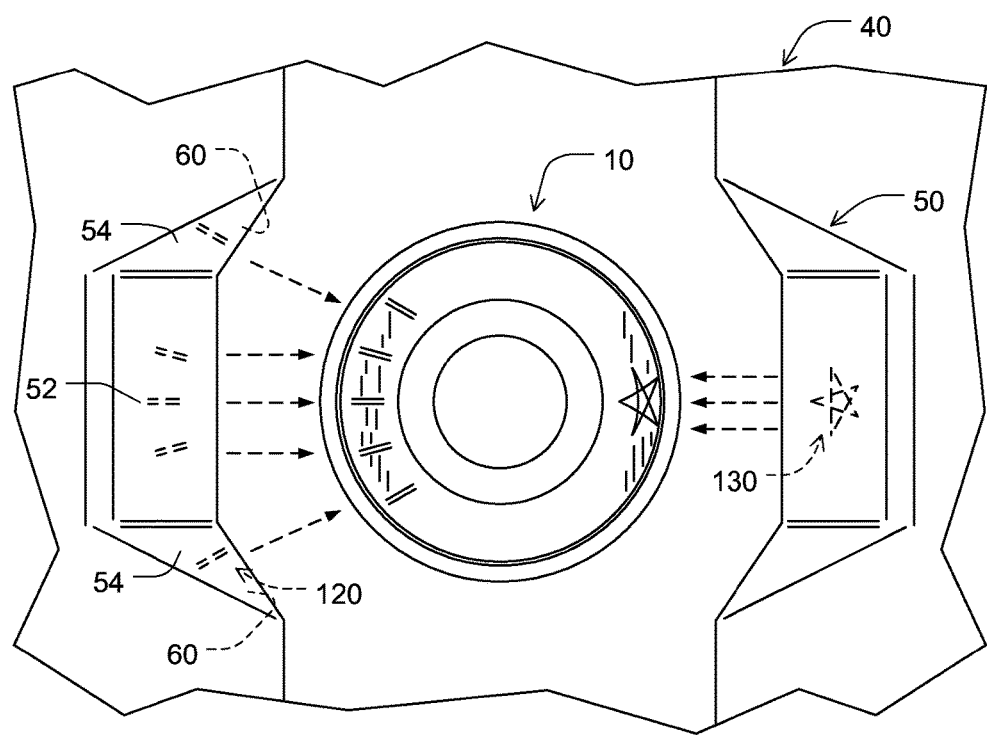
FIG. 3 is a top view showing the operational device.
Figure 3:
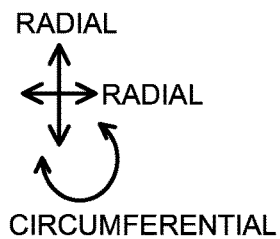

In FIG. 3, the screen 92 may indicate a symbol 120 and/or 130 behind the visor 50. The symbol 120 and/or 130 may be reflected on the reflective surface 60 of the visor 50 and directed toward the lateral surface 14a of the knob 10. Thus, the symbol 120 and/or 130 may be projected on the lateral surface 14a of the knob 10. The symbol 120 and/or 130 may be, for example, a letter, a gauge, and/or a graphical image. In the example of FIG. 3, the screen 92 may indicate gauges 120 to project the gauges 120 on the lateral surface 14a of the knob 10 on the left side in the drawing. The screen 92 may indicate an image 130 to project the image 130 on the lateral surface 14a of the knob 10 on the right side in the drawing. The ECU 100 may create the symbol 120 and/or 130 according to an operating condition of the vehicle such as a speed, engine revolution, traffic condition, and/or the like.

In FIG. 3, a part of the reflective surface 60 of the side plate portion 54 may reflect a portion of the gauge 120 toward the lateral surface 14a of the knob 10 thereby to project the portion of the gauge 120 at an angled position on the lateral surface 14a.

The operational device 1 may be employed for various operational devices such as an operational console of an air conditioning device to set a set temperature of a cabin of the vehicle.

(Second Embodiment)

Figure 4:
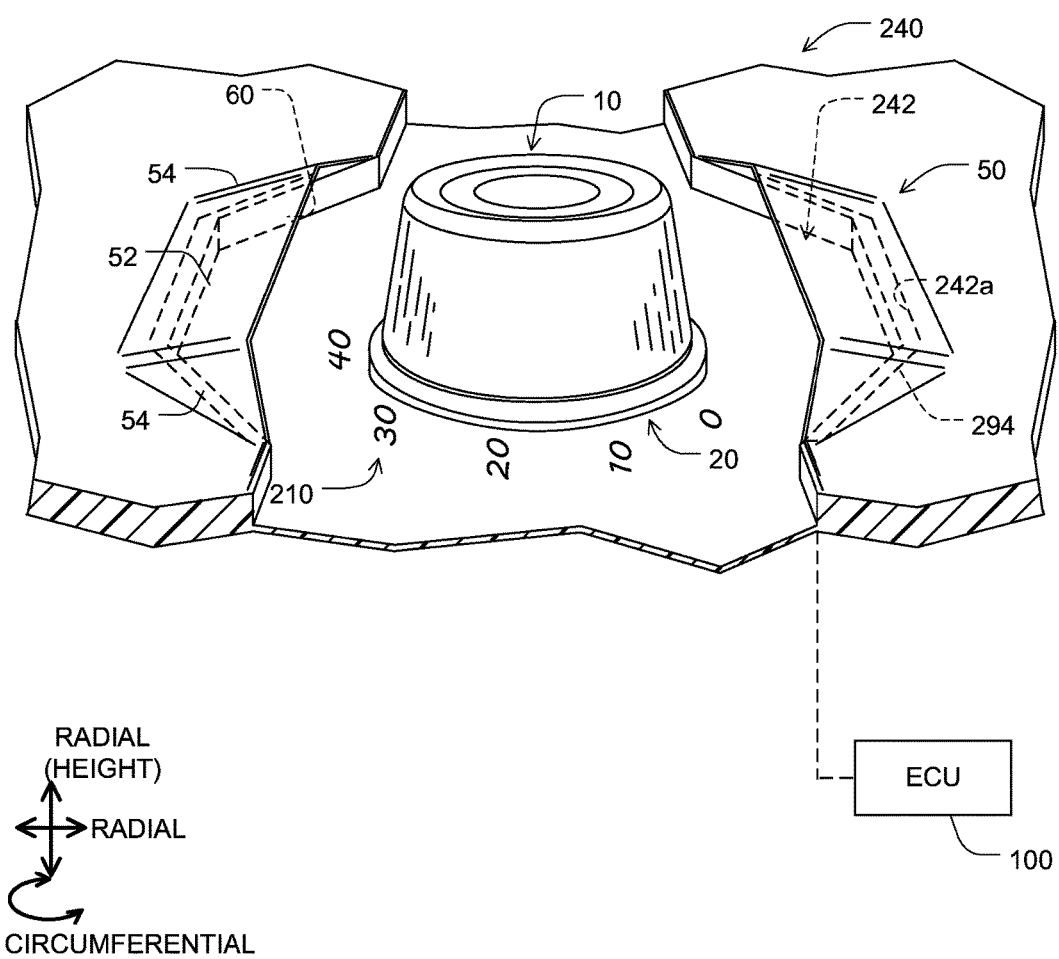
FIG. 4 is a perspective view showing an operational device of a second embodiment.
Figure 5:
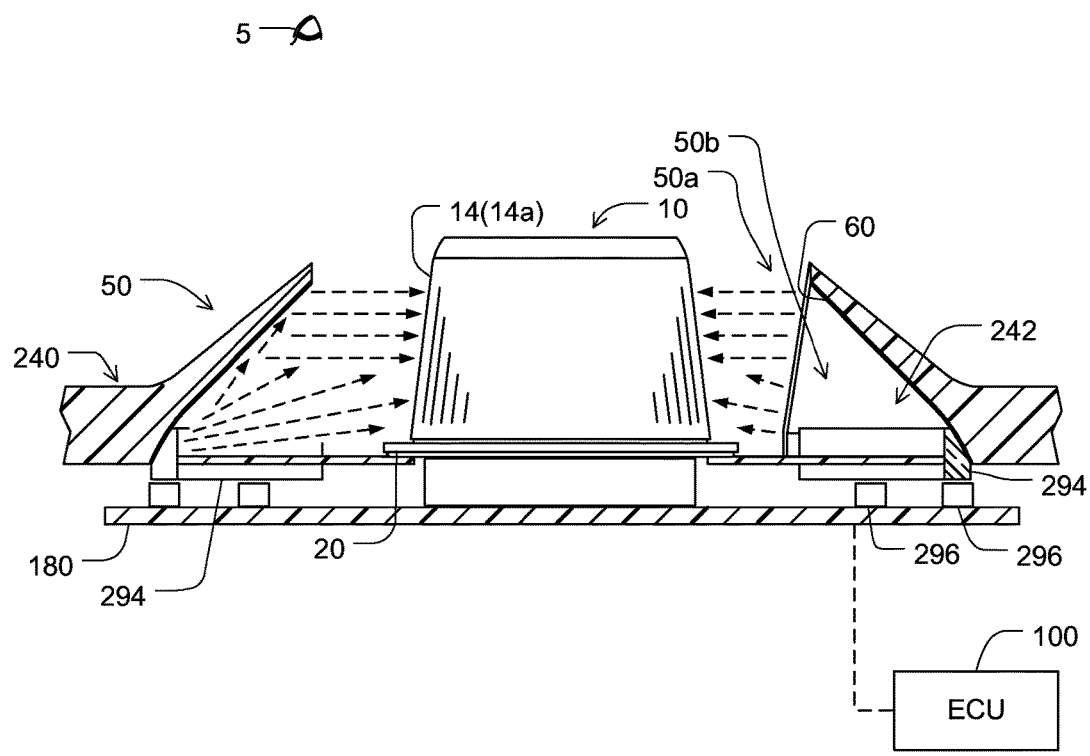
FIG. 5 is a partially sectional view showing the operational device of the second embodiment.

As shown in FIGS. 4 and 5, in the example, an operational device 201 may not include the display device 90 described in the first embodiment. In FIG. 4, the knob 10 and the bezel 20 may be mounted on a base plate 240. A light conductor 294 may be in an arc shape or in a bent shape extending along a periphery 242a of a dent 242. The light conductor 294 may surround the knob 10 and the bezel 20. The light conductor 294 may be formed of a non-opaque material.

Symbols 210 may be printed on the surface of the base plate 240. In the example, the symbols 210 may not be modifiable.

In FIG. 5, the light conductor 294 may be concealed behind the visor 50 from a viewpoint of a user 5. The light conductor 294 may be extended in the height direction from the rear side of the base plate 240 though the base plate 240 into the dent 242. Multiple light sources 296 may be equipped on the PCB 180 such that the light sources 296 are faced to a backside of the light conductor 294. In the example, each of the light sources 296 may emit light through the backside (rear surface) of the light conductor 294 into the light conductor 294. The light conductor 294 may diffuse the light therethough and may irradiate the light in an angular range toward the reflective surface 60 behind the visor 50. The reflective surface 60 of the visor 50 may reflect the light toward the lateral surface 14a of the knob 10. In the example, the light conductor 294 and the light source 296 may function as a light source.

(Third Embodiment)

Figure 6:
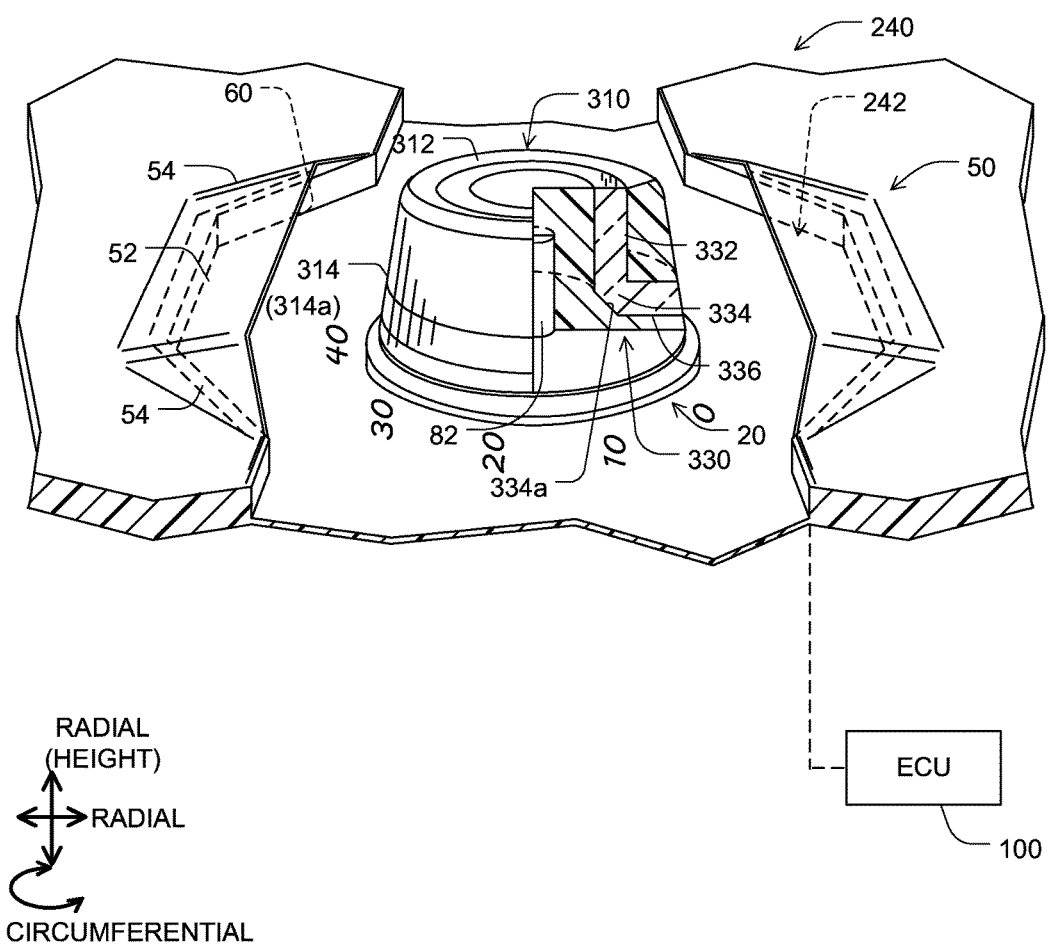
FIG. 6 is a perspective view showing an operational device of a third embodiment.
Figure 7:
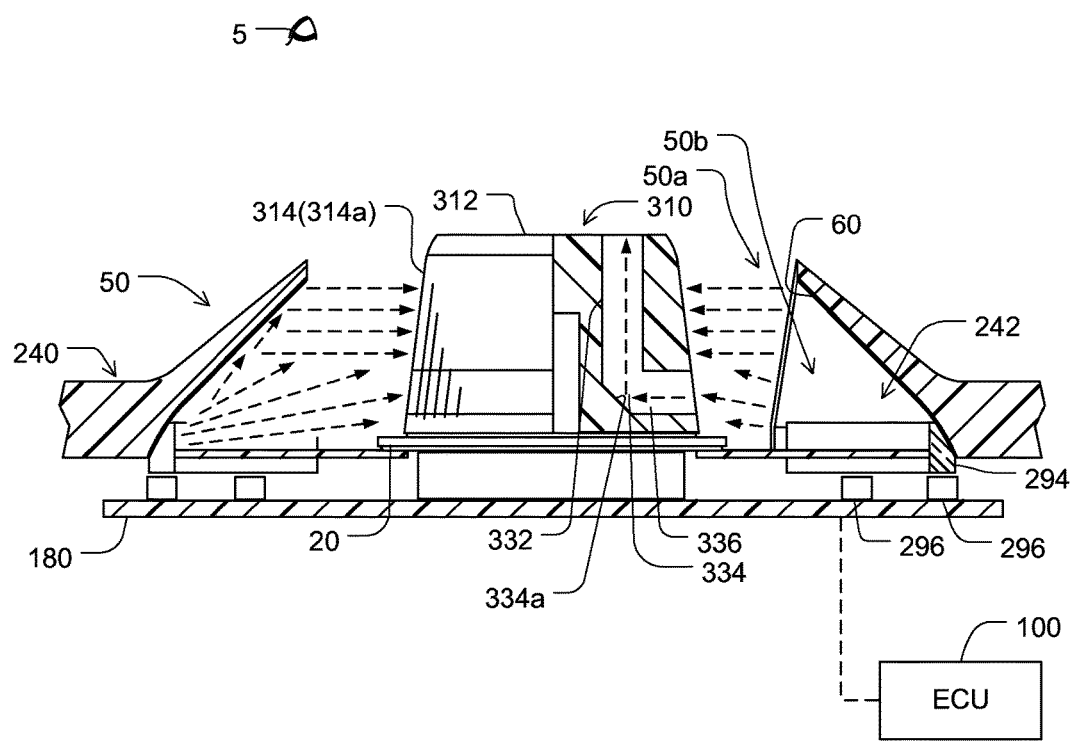
FIG. 7 is a partially sectional view showing the operational device of the third embodiment.
Figure 8:
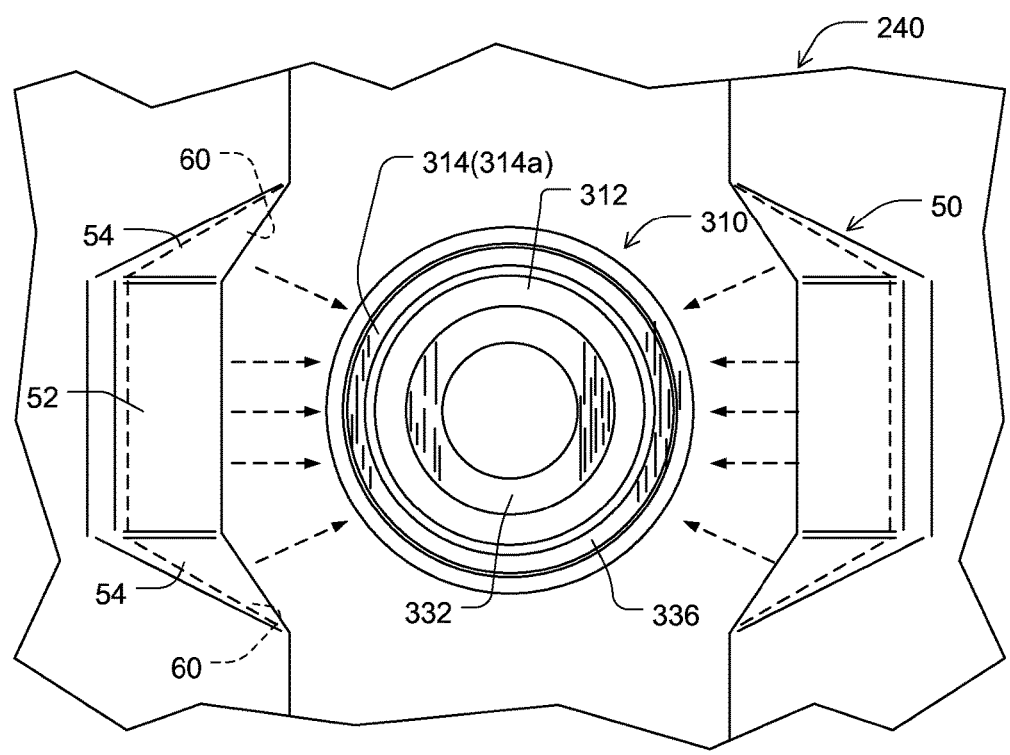
FIG. 8 is a top view showing the operational device of the third embodiment.
Figure 8:
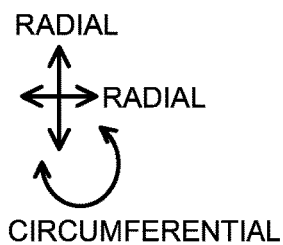

As shown in FIGS. 6 to 8, in the example, an operational device 301 may include a knob 310. The knob 310 may include an inner light conductor 330. In FIGS. 6 and 7, the inner light conductor 330 may include a tubular portion 332, a tapered portion 334, and a disc portion 336, which may be integrally formed of a non-opaque material. The tubular portion 332 may be in a tubular shape and may extend in the height direction. The disc portion 336 may be in a disc shape extending in the circumferential direction and having a width in the radial direction. The tapered portion 334 connects the tubular portion 332 with the disc portion 336. The tapered portion 334 may have a tapered inner surface 334a inclined relative to both the height direction and the radial direction.

In FIG. 7, light emitted from the light conductor 294 may be reflected on the reflective surface 60 of the visor 50 toward a lateral surface 314a of a sidewall 314 of the knob 310. The light may incident through a circumferential periphery of the disc portion 336 to be reflected on the tapered inner surface 334a of the tapered portion 334. Thus, the light may be directed upward in the height direction to pass through the tubular portion 332.

In FIG. 8, the light reflected on the reflective surface 60 of the visor 50 may be directed toward the lateral surface 314a of the sidewall 314 of the knob 310. The light may also illuminate the circumferential periphery of the disc portion 336. The light passing though the tubular portion 332 may illuminate a portion of the end surface of the tubular portion 332 on the side of the visor 50.

(Fourth Embodiment)

Figure 9:
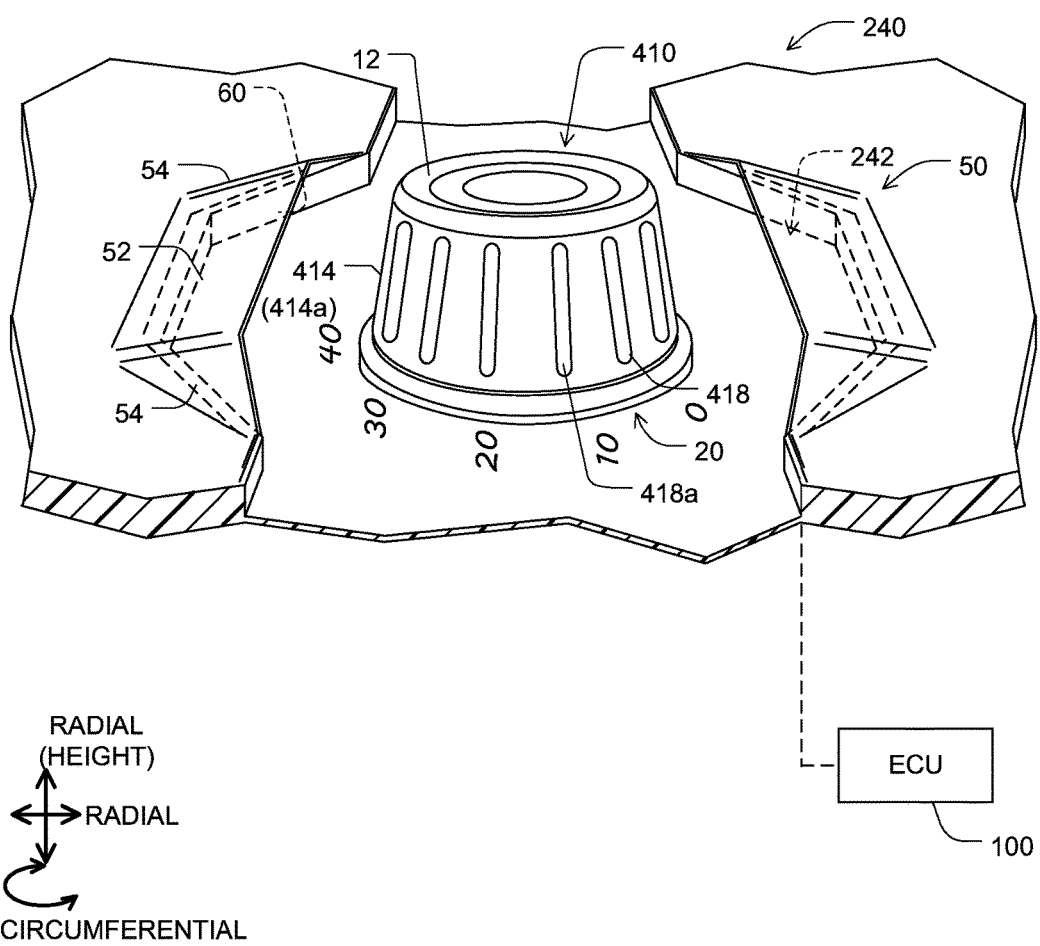
FIG. 9 is a perspective view showing an operational device of a fourth embodiment.

As shown in FIG. 9, in the example, an operational device 401 may include a knob 410. A lateral surface 414a of a sidewall 414 of the knob 410 may have multiple grooves 418. Each of the grooves 418 may be dent 242 from the lateral surface 414a to have a semicircular cross section. The groove 418 may be extended linearly in the height direction. The groove 418 may have a bottom surface forming a reflective surface 418a. Specifically, the bottom surface of the groove 418 may be plated with a reflective material such as chrome. The reflective surface 418a of the groove 418 may reflect light from the reflective surface 60 of the visor 50. The reflected light may be directed toward the viewpoint of a user 5. The reflective surface 418a of the groove 418 may produce a luster different from that of the lateral surface 414a.

(Fifth Embodiment)

Figure 10:
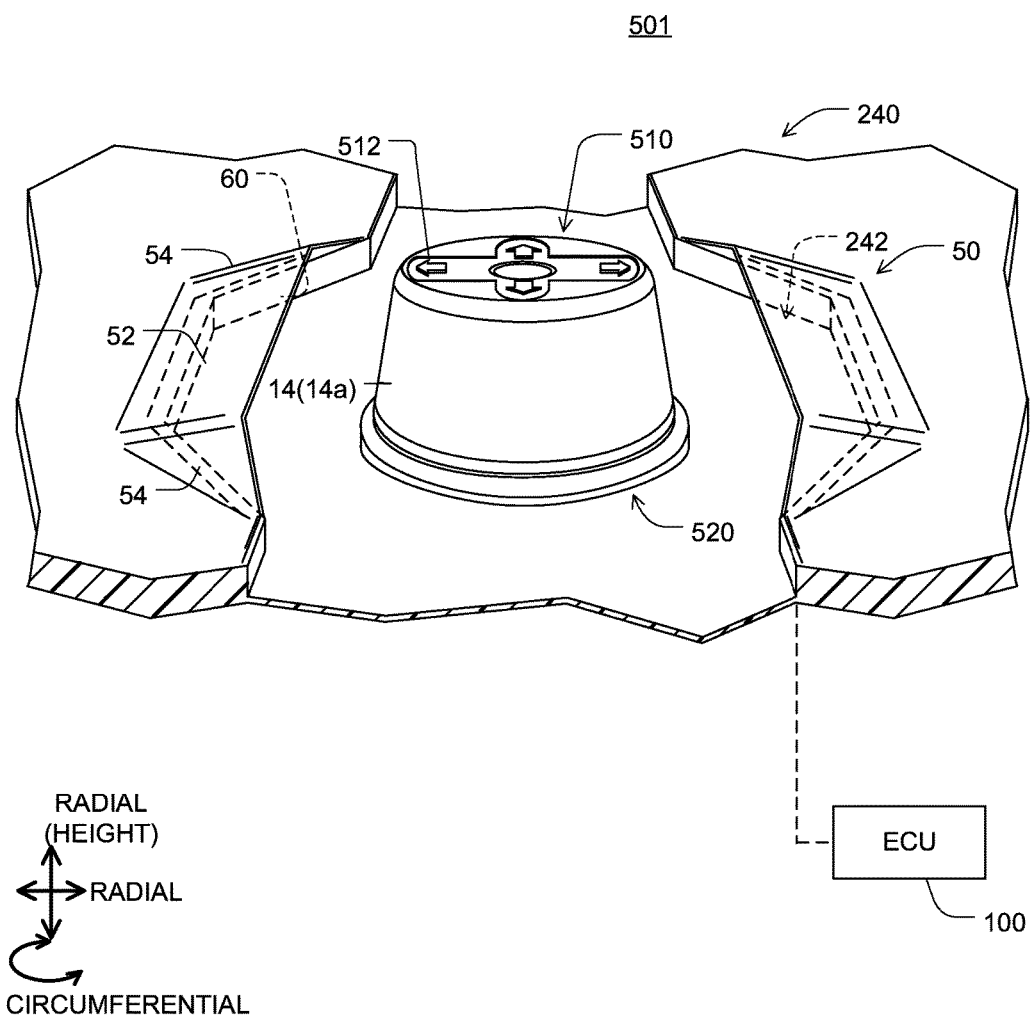
FIG. 10 is a perspective view showing an operational device of a fourth embodiment.

As shown in FIG. 10, in the example, an operational device 501 may include a lever 510, instead of the knob 310 in the above embodiments. The lever 510 may function as an operational element.

The lever 510 may be in a chamfered conical shape. The lever 510 may be a cross key having four arrow keys corresponding to four directions. The lever 510 may be pivoted on a bezel 520 and may be configured to be inclined relative to the base plate 40. The lever 510 may press an internal switch (encoder) when a corresponding arrow key is depressed by a user to incline the lever 510 relative to the base plate 40.

The internal switch may be connected with the ECU 100 and may send a signal to the ECU 100. Thus, the ECU 100 may detect depression of the arrow key. For example, a user may manipulate the operational device 501 to instruct a direction to move a cursor on a screen of a infotainment device. The lever may be a lever or a joystick.

(Other Example)

The elements of the embodiments may be partially or entirely replaced with each other or combined with each other. The display device may be employed in the second to fifth embodiment. The knob in the third to fourth embodiment may be employed in the first embodiment. The display device of the first embodiment may be combined with the light source and/or the light conductor of the second to fifth embodiments. The reflective surface 60 may be omitted from the visor 50.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it may be to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An operational device comprising:
   a base;
   an operational element configured to receive manipulation and movable relative to the base;
   a light source configured to emit light; and
   a visor extended from the base and located on an upper side of the light source, wherein the visor has a reflective surface faced to the light source.

2. The operational device of claim 1, wherein
   the base forms a dent recessed inward behind the visor, and
   the visor is opposed to the light source through the dent.

3. The operational device of claim 1, wherein
   the visor forms an opening opposed to a lateral surface of the operational element.

4. The operational device of claim 3, wherein
   the opening is in one of a trapezoidal shape, a semicircular shape, and a semioval shape.

5. The operational device of claim 1, wherein
   the visor includes a center plate portion and a side plate portions, and
   the center plate portion is interposed between the side plate portions and inclined relative to the side plate portions.

6. The operational device of claim 1, wherein
   the light source is a screen of a display device configured to create indication on the screen.

7. The operational device of claim 6, wherein
   the screen surrounds the operational element.

8. The operational device of claim 6, wherein
   the screen is configured to indicate a symbol, and
   the visor is configured to reflect the symbol and to project the symbol on a lateral surface of the operational element.

9. The operational device of claim 1, wherein
   the light source includes a light conductor being non-opaque and located behind the visor, and
   the light conductor is configured to conduct light and to emit the light toward the visor.

10. The operational device of claim 1, wherein
the operational element includes an inner light conductor being non-opaque, and
the inner light conductor is configured to conduct light from a lateral surface of the inner light conductor to a top surface of the inner light conductor.

11. The operational device of claim 10, wherein
the inner light conductor includes a tubular portion, a tapered portion, and a disc portion, which are integrated with each other,
the tapered portion connects the tubular portion with the disc portion,
the tapered portion has a tapered inner surface, and
the inner light conductor is configured to conduct light from a lateral surface of the disc portion and to reflect the light on the tapered inner surface toward a top surface of the tubular portion.

12. The operational device of claim 10, wherein
the operational element has a sidewall having a plurality of grooves, and
at least one of the grooves has a reflective surface.

13. The operational device of claim 1, wherein
the operational element is a knob rotational relative to the base.

14. The operational device of claim 1, wherein
the operational element is a lever configured to be inclined relative to the base.

* * * * *